May 16, 1961 T. E. PIAZZE ET AL 2,984,055
VACUUMIZING AND SEALING MACHINE FOR PLASTIC BAGS
Filed Sept. 24, 1958 6 Sheets-Sheet 1
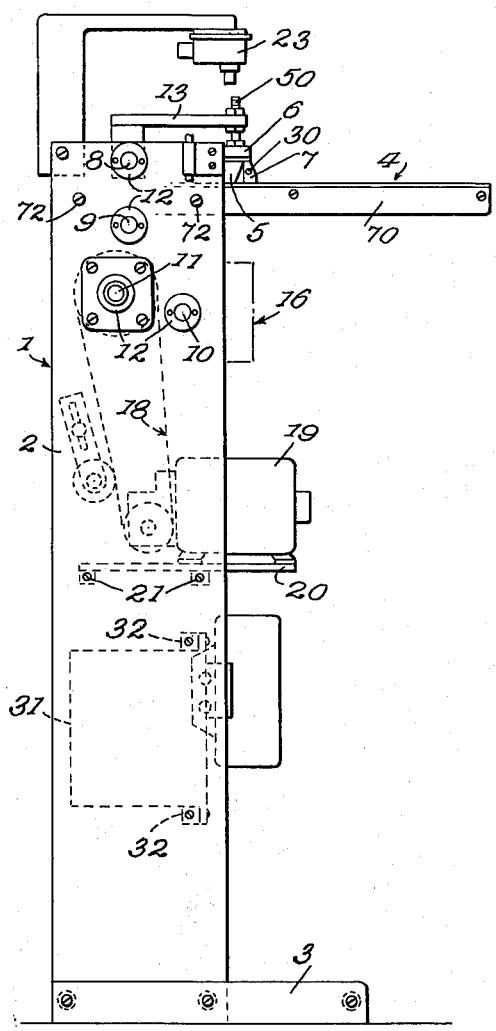
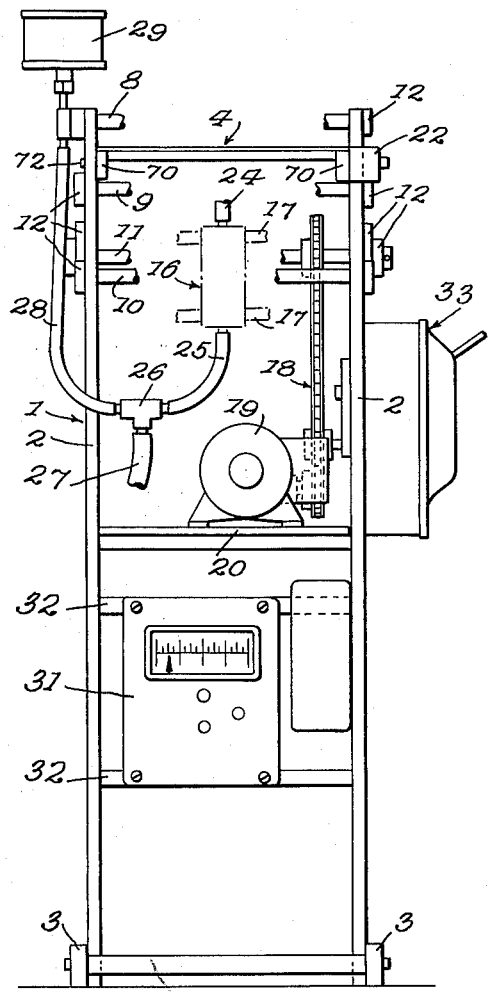
INVENTORS
Thomas E. Piazze.
Roy B. Cook.
BY Mason, Porter, Diller & Stewart
ATTORNEYS

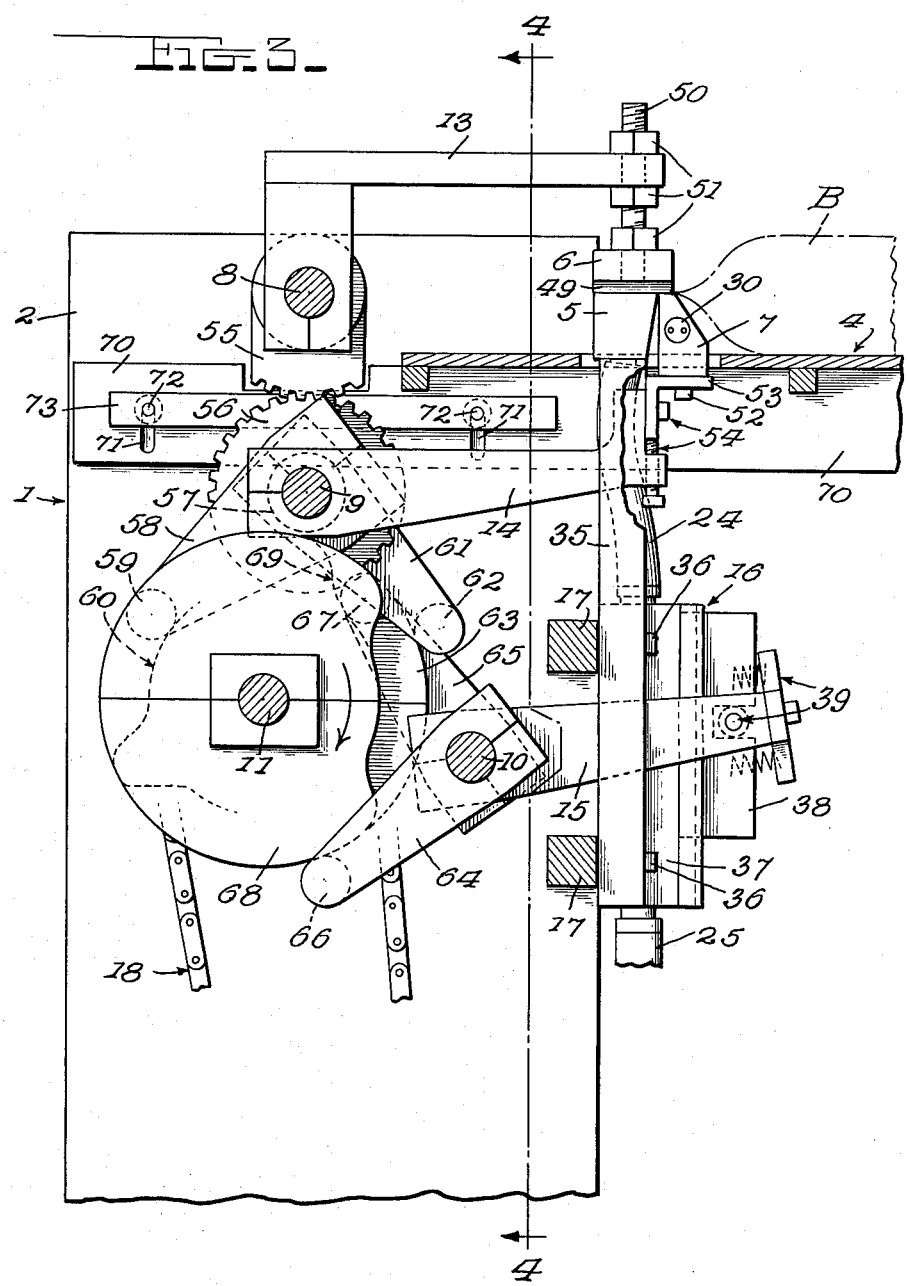

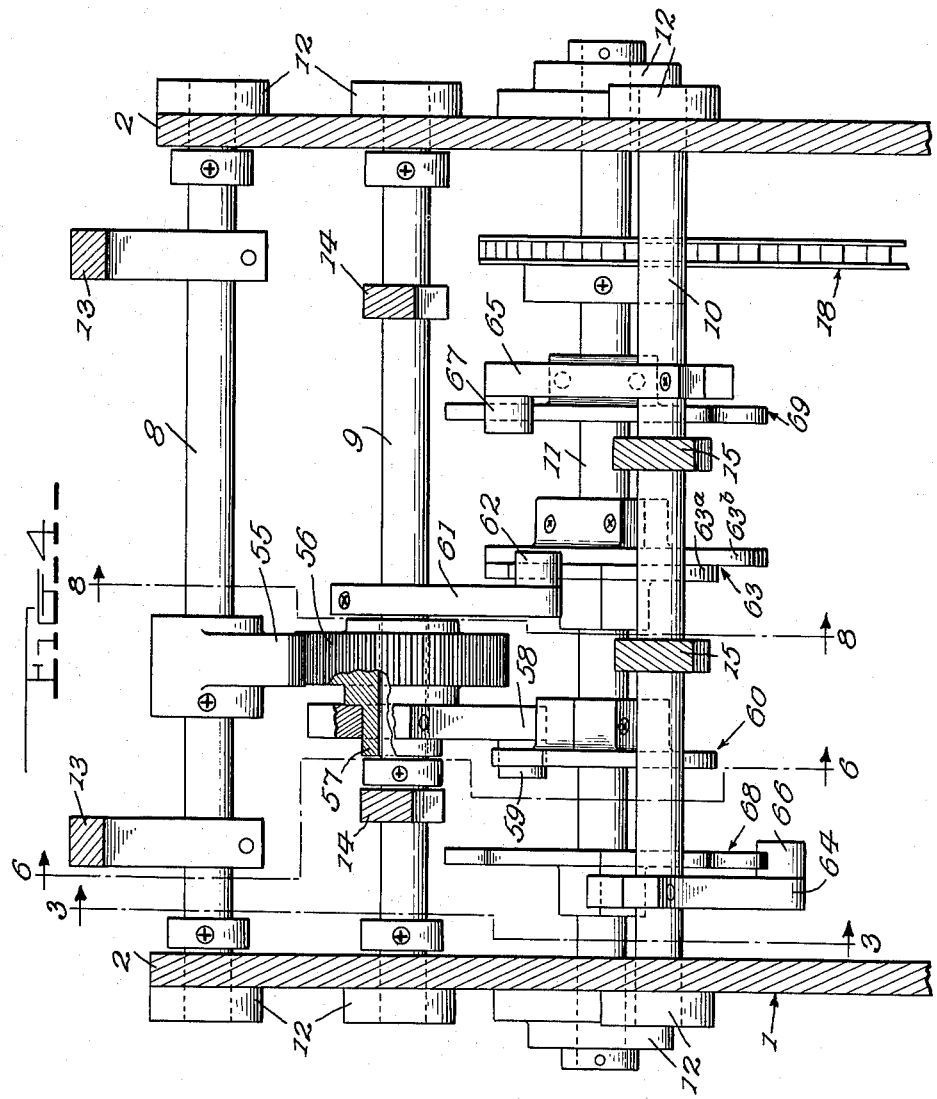

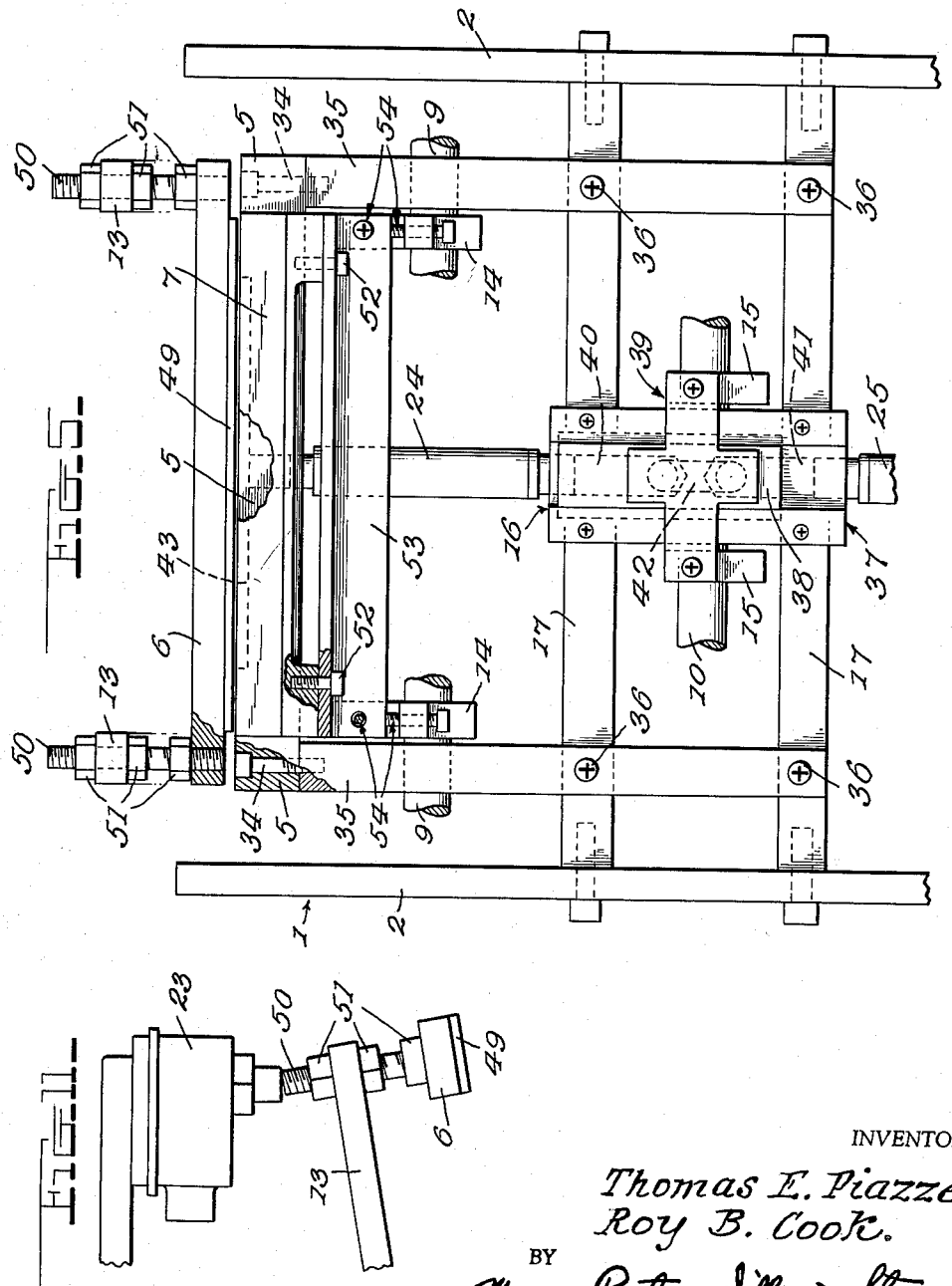

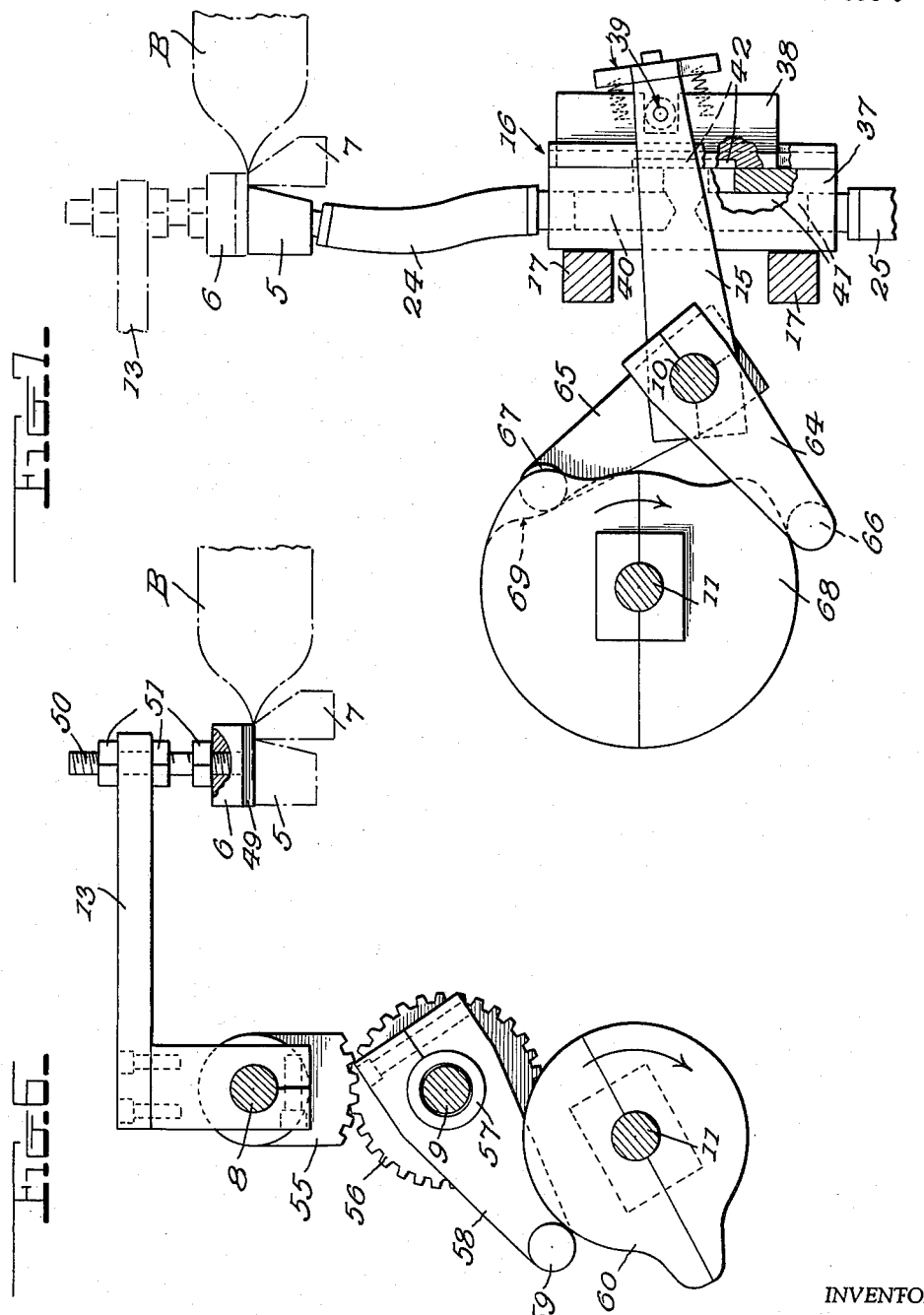

May 16, 1961  T. E. PIAZZE ET AL  2,984,055
VACUUMIZING AND SEALING MACHINE FOR PLASTIC BAGS
Filed Sept. 24, 1958  6 Sheets-Sheet 6
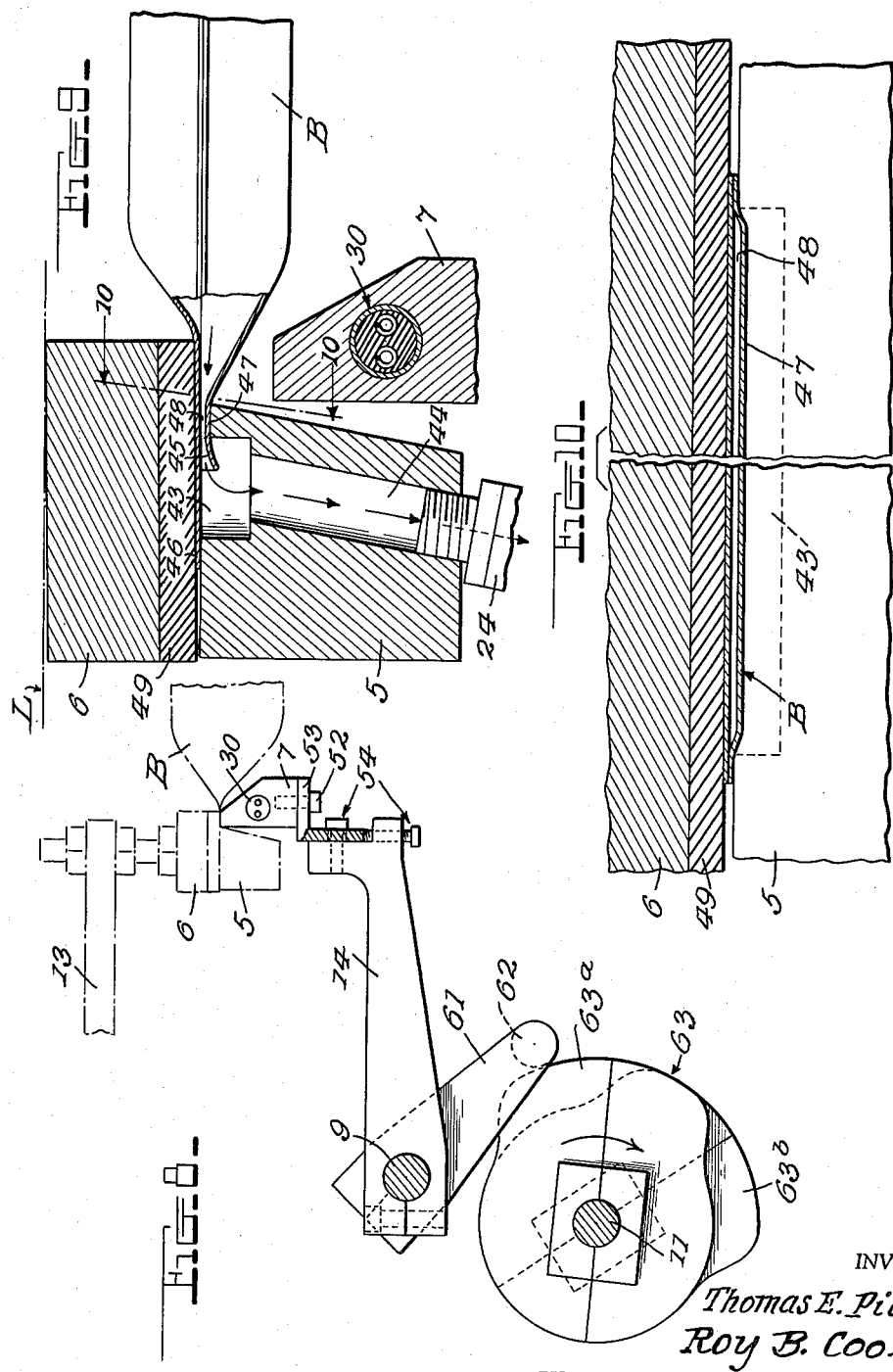
INVENTORS
Thomas E. Piazze.
Roy B. Cook.
BY
Mason, Porter, Diller & Stewart
ATTORNEYS United States Patent Office 2,984,055
Patented May 16, 1961

2,984,055
VACUUMIZING AND SEALING MACHINE FOR PLASTIC BAGS

Thomas E. Piazze, Mount Vernon, and Roy B. Cook, Fredericktown, Ohio, assignors to Continental Can Company, Inc., New York, N.Y., a corporation of New York Filed Sept. 24, 1958, Ser. No. 763,058

8 Claims. (Cl. 53—9)

This invention aims to provide a small, light, simple, rapid and efficient, semi-automatic machine for vacuumizing and sealing previously filled plastic bags.

The machine includes a vacuum bar upon which to place the mouth portion of a bag, a pressure bar above said vacuum bar and operative, when lowered, to hold the bag mouth in comunication with the vacuum bar, and a sealing bar abreast of said vacuum bar and operative, when raised, to heat-seal the vacuumized bag: and a further object of the invention is to provide a simple and effective mechanism for causing operation of said bars in the necessary sequence to vacuumize and seal the bag.

Another object is to so construct the vacuum bar and the pressure bar as to insure communication of the bag mouth with a recess of said vacuum bar for air evacuation from the bag.

A further object is to provide the pressure bar with a portion which overhangs the sealing bar and coacts therewith in gripping the bag walls while these walls are being heat-sealed together.

With the above and other objects in view that will hereinafter appear, the nature of the invention will be more clearly understood by reference to the following detailed description, the appended claims and the several views illustrated in the accompanying drawings.

In the drawings:

Figures 1 and 2 are respectively a side view and a front view omitting various elements which could not well be shown at the reduced scale of these views.

Figure 3 is a vertical sectional view through the upper portion of the machine, on line 3—3 of Figure 4.

Figure 4 is a vertical sectional view on line 4—4 of Figure 3, the bag supporting table being removed.

Figure 5 is a fragmentary front elevation showing more particularly the vacuum bar, the pressure bar, the sealing bar and the vacuum valve.

Figure 6 is a vertical sectional view on line 6—6 of Figure 4 but confined to illustration of the pressure bar and its operating mechanism.

Figure 7 is a vertical sectional view on the above mentioned line 3—3 of Figure 4 but confined to illustration of the vacuum bar, the associated vacuum conduits and valve, and the operating mechanism for said valve.

Figure 8 is a vertical sectional view on line 8—8 of Figure 4 but confined to illustration of the sealing bar and its operating mechanism.

Figure 9 is an enlarged detail vertical section showing a bag being vacuumized.

Figure 10 is a fragmentary sectional view on line 10—10 of Figure 9.

Fig. 11 is a fragmentary side view showing more particularly the pressure bar and motor stopping switch.

The specific construction disclosed may be considered as preferred and will be rather specifically described, but it is to be understood that variations may well be made.

A frame structure 1 (Figures 1 and 2) is provided, including two vertically elongated side plates 2, said side plates having suitable feet 3. A vertically adjustable bag supporting table 4 is secured between the upper front portions of the side plates 2 and projects forwardly therefrom. At the rear portion of this table, a vacuum bar 5, a pressure bar 6 and a sealing bar 7, are located.

Three rock shafts 8, 9 and 10 and a cam shaft 11 extend between the side plates 2 and are mounted in suitable bearings 12 secured to said side plates. The upper rock shaft 8 is provided with arms 13 which carry the pressure bar 6; the next lower rock shaft 9 is provided with arms 14 which carry the sealing bar 7; and the lowermost rock shaft 10 is provided with arms 15 for actuating a valve 16 which places the vacuum bar 5 in and out of communication with a source of vacuum. The valve 16 is mounted on cross bars 17 (Figures 3 and 5) secured to the side plates 2.

By means later described, the three rock shafts are actuated in proper sequence when the cam shaft 11 is rotated one revolution. A chain and sprocket drive 18 operatively connects this cam shaft with a gear motor 19 mounted on a shelf 20 which is secured at 21 to the side plates 2. A push button reset switch 22 (Figure 2) is provided for starting this motor and a micro-switch 23 (Figures 1 and 11) is provided for stopping said motor when the cam shaft 11 has made one revolution. Switch 22 is manually operated and switch 23 is operated upon ascent of one of the arms 13 as seen in Figure 11, at the completion of the machine cycle.

A hose 24 (Figures 2, 3, 5 and 7) connects the valve 16 with the vacuum bar 5, a hose 25 and T 26 connect said valve with a vacuum line 27 extending to a source of vacuum, and a hose 28 extends from said T 26 to a pressure gage 29.

The sealing bar 7 has an electric heater 30 (Figures 1, 3 and 9) and the circuit for this heater includes a temperature regulator and indicator 31 (Figures 1 and 2) mounted on bars 32 secured to the side plates 2. A switch 33 (Figure 2) is provided for connecting the machine to and disconnecting it from the line.

The vacuum bar 5 is secured at 34 (Figure 5) upon the upper ends of vertical bars 35 and these bars are secured at 36 to the horizontal bars 17 upon which the vacuum valve 16 is mounted. This valve includes a fixed body 37 (Figures 3, 5 and 7) and a vertically slidable valve member 38, the latter being connected at 39 with the front ends of the arms 15. The body 37 has an upper port 40 (Figures 5 and 7) communicating with the hose 24 and a lower port 41 communicating with the hose 25. The slidable valve member 38 has a port 42 which, when said valve member is raised to the position shown, establishes communication between the two ports 40 and 41, the vacuum bar 5 being then in communication with the source of vacuum to withdraw air from the bag B. This comunication is cut off when the arms 15 lower the valve member 38.

As shown in Figures 5, 9 and 10, the upper side of the vacuum bar 5 has a longitudinal recess 43 to be spanned by the mouth portion of a bag B laid on the table 4. The bar 5 also has a duct 44 placing the recess 43 in communication with the hose 24. The bag shown has a short lower lip 45 and a long upper lip 46 projecting beyond said lower lip 45. At the rear side of the recess 43, the upper side of the bar 5 is slightly recessed at 47 to prevent clamping of the lower lip 45 against the upper lip 46 when the pressure bar 6 is lowered to operative position, thus insuring an air evacuation passage 48 from the bag interior to the recess 43.

The pressure bar 6 has a yieldable layer 49 of neoprene or the like at its lower side to gently clamp the mouth portion of the bag B against the vacuum bar 5 and prevent leakage of atmospheric air into the recess 43 around said mouth portion. To better accommodate the single thickness of bag material where the upper lip 46 projects beyond the lower lip 45, and the double thickness elsewhere, the pressure bar 6 is preferably angled slightly as can be seen by comparing said bar with the horizontal line L in Figure 9.

The sealing bar 7 is disposed abreast of the vacuum bar 5 and occupies a lowered position (Figure 9) until the bag has been vacuumized and is to be sealed. Then, the bar 7 is raised and forces the lower bag wall against the upper wall contacting with the yieldable layer 49 of the pressure bar 6, the two walls being thus gripped and heat-sealed together. In this connection, it will be observed that the pressure bar 6 and its yieldable layer 49 project forwardly beyond the vacuum bar 5 and overhang the sealing bar 7 for coaction with the sealing bar.

The pressure bar 6 is adjustably connected with its carrying arms 13, by means of threaded studs 50 and nuts 51: and the upper end of one of said studs 50 may be utilized to operate the motor stopping switch 23 as shown in Figure 11, upon raising of the arms 13. The studs and nuts permit accurate adjustment of the pressure bar 6 to attain the desired light but firm clamping of the bag mouth onto the vacuum bar 5.

The sealing bar 7 is secured at 52 (Figures 3, 5 and 8) upon an angle bar 53 and this angle bar is adjustably mounted at 54 on the front ends of the arms 14. Adjustment of the sealing bar 7 is thus permitted to attain the desired pressure for heat-sealing the bag.

The upper rock shaft 8 to which the arms 13 are secured is provided with a gear segment 55 (Figures 3, 4 and 6). This segment meshes wth a gear 56 which is loose upon the rock shaft 9. The gear 56 has a hub 57 to which an arm 58 is secured, said arm having a cam follower 59. A cam 60 is secured on the cam shaft 11 for operating the arm 58, gearing 55—56, rock shaft 8 and arms 13 to raise and lower the pressure bar 6 as required.

The rock shaft 9 has an arm 61 (Figures 3, 4 and 8). This arm has a cam follower 62 cooperable with a cam 63 on the cam shaft 11, to so rock said shaft 9 as to operate the arms 14 and raise and lower the sealing bar 7 as required. The cam 63 is preferably formed from two relatively adjustable sections 63a and 63b permitting such circumferential variance of said cam as to adjust the dwell of the sealing bar 7 in its operative position.

The rock shaft 10 has two arms 64 and 65 (Figures 3, 4 and 7), said arms having cam followers 66 and 67 respectively. One cam 68 on the cam shaft 11 coacts with the follower 66 of arm 64 to so operate the rock shaft 10 and arms 15 as to slide the valve member 38 upwardly to open position as seen in Figure 7. Another cam 69 on the cam shaft 11 coacts with the follower 67 of the arm 65 to so operate the rock shaft 10 and arms 15 as to downwardly slide the valve member to closed position. The placing of the vacuum bar 5 in and out of communication with the vacuum source is thus controlled.

The table 4 includes parallel supporting bars 70 (Figures 1, 2 and 3). The rear end portions of these bars lie against the inner sides of the frame side plates 2 and have vertical slots 71 (Figure 3). Clamping screws 72 extend through the side plates 2 and through the slots 71 and are threaded into openings in clamping bars 73 which lie against the inner sides of the bars 70. One of these clamping bars 73 is shown in Figure 3. When the screws 72 are loosened, the bars 70 are freed to allow vertical adjustment of the table 4 to the most advantageous level.

Operation

When the machine is at rest, the pressure bar 6 occupies raised position, the sealing bar 7 occupies lowered position and the valve member 38 is in closed position to cut off communication of the vacuum bar 5 with the source of vacuum to which the conduit 27 extends. When a filled bag is to be vacuumized and sealed it is laid upon the table 4 with its lips 45 and 46 positioned as shown in Figure 9. Then the switch 22 is operated to start the motor 19 and drive the cam shaft 11, starting the cycle. During this cycle, pressure bar 6 lowers and holds the bag as shown in Figure 9, the valve member 38 moves to open position and causes evacuation of air from the bag, the sealing bar 7 rises and seals the bag, the valve member 38 returns to closed position, the sealing bar 7 returns to lowered position and the pressure bar 6 returns to raised position. The cycle is here terminated automatically by the switch 23 actuated by one of the carrying arms 13 of the pressure bar 6.

Attention is again invited to the possibility of making variations within the scope of the invention.

We claim:

1. A vacuumizing and sealing machine for plastic bags, comprising a frame, a vacuum bar upon which to place the bag mouth, said vacuum bar being disposed at the front of and being secured to said frame, a pressure bar above said vacuum bar and operative when lowered to hold the bag mouth in communication with said vacuum bar, a sealing bar abreast of said vacuum bar and operative when raised to heat-seal the bag, a rock shaft mounted on said frame in rearwardly spaced parallel relation with said vacuum bar, said rock shaft having forwardly projecting arms secured to and carrying said pressure bar, a gear member secured to said rock shaft, a second rock shaft mounted on said frame under and parallel with the first mentioned rock shaft, said second rock shaft having forwardly projecting arms secured to and carrying said sealing bar, an arm secured to said second rock shaft and having a cam follower, a second gear member loose on said second rock shaft and meshing with the first mentioned gear member, an arm secured to said second gear member and having a cam follower, duct means connected with said vacuum bar and having a valve operative to place said vacuum bar in and out of communication with a vacuum source, said valve being mounted on said frame and having a vertically movable valve member, a third rock shaft mounted on said frame in spaced parallel relation with the aforesaid rock shafts, an arm secured to said third rock shaft and connected with said vertically movable valve member, another arm secured to said third rock shaft and having a cam follower, a cam shaft mounted on said frame in spaced parallel relation with the aforesaid rock shafts, and cams on said cam shaft and engaging the aforesaid cam followers, said cams and followers being cooperable in causing operation of said pressure bar, said valve and said sealing bar to effect bag vacuumizing and sealing of the bag.

2. A vacuumizing and sealing machine for plastic bags, comprising a frame, a vacuum bar upon which to place the bag mouth, said vacuum bar being disposed at the front of and being secured to said frame, a pressure bar above said vacuum bar and operative when lowered to hold the bag mouth in communication with said vacuum bar, a sealing bar abreast of said vacuum bar and operative when raised to heat-seal the bag, a rock shaft mounted on said frame in rearwardly spaced parallel relation with said vacuum bar, said rock shaft having forwardly projecting arms secured to and carrying said pressure bar, a gear member secured to said rock shaft, a second rock shaft mounted on said frame under and parallel with the first mentioned rock shaft, said second rock shaft having forwardly projecting arms secured to and carrying said sealing bar, an arm secured to said second rock shaft and having a cam follower, a second gear member loose on said second rock shaft and meshing with the first mentioned gear member, an arm secured to said second gear member and having a cam follower, duct means connected with said vacuum bar and having a valve operative to place said vacuum bar in and out of communication with a vacuum source, said valve being mounted on said frame and having a vertically movable valve member, a third rock shaft mounted on said frame in spaced parallel relation with the aforesaid rock shafts, an arm secured to said third rock shaft and connected with said vertically movable valve member, two arms secured to said third rock shaft for rocking it in opposite directions respectively, these arms being provided with cam followers, a cam shaft mounted on said frame in spaced parallel relation with the aforesaid rock shafts, and cams on said cam shaft and engaging the aforesaid cam followers, said cams and followers being cooperable in causing operation of said pressure bar, said valve and said sealing bar to effect bag vacuumizing and sealing.

3. In a machine for vacuumizing and sealing plastic bags, a horizontal vacuum bar upon which to lay a bag mouth having a relatively short lower lip and a relatively long upper lip, said vacuum bar having an upwardly open recess to communicate with the bag mouth and also having a vacuum duct communicating with said recess, a pressure bar over said vacuum bar and operable when lowered to hold the bag mouth in communication with said recess, said pressure bar having a layer of yieldable material at its lower side to contact with the upper bag wall and lip and thereby hold the lower bag wall and lip upon said vacuum bar, the upper side of said vacuum bar being further recessed at one side of said first mentioned recess to receive an intermediate portion of the lower bag lip and to prevent clamping of the upper and lower bag lips together when said pressure bar is lowered, and means for sealing the bag after vacuumizing thereof.

4. In a machine for vacuumizing and sealing plastic bags, a horizontal vacuum bar upon which to lay a bag mouth having a relatively short lower lip and a relatively long upper lip, said vacuum bar having an upwardly open recess to communicate with the bag mouth and also having a vacuum duct communicating with said recess, a pressure bar over said vacuum bar and operable when lowered to hold the bag mouth in communication with said recess, said pressure bar having a layer of yieldable material at its lower side to contact with the upper bag wall and lip and thereby hold the lower bag wall and lip upon said vacuum bar, the upper side of said vacuum bar being further recessed at one side of said first mentioned recess to receive an intermediate portion of the lower bag lip and to prevent clamping of the upper and lower bag lips together when said pressure bar is lowered, and a sealing bar abreast of said vacuum bar and operable when raised to heat-seal the bag, said layer of yieldable material having a portion overhanging said sealing bar to prevent upward movement of the upper bag wall when said sealing bar is raised to heat-seal the two walls together.

5. In a method of sealing together the walls of a container of the type having a flexible heat sealable longer wall and an opposite heat sealable shorter wall, and which longer wall is adapted to extend over an air evacuating member and provide an air evacuating passage opening into the container, the steps of placing said container with the longer wall being disposed against an air evacuating member with said air evacuating passage in communication with said air evacuating member, exhausting air from said air evacuating member and thereby evacuating air from the container, applying a heated sealing bar against the outer side of the shorter wall across said air evacuating member before removing the container from said air evacuating member, and so moving said heated sealing member as to press said shorter wall against said longer wall to seal together.

6. A vacuumizing and sealing machine for plastic bags, comprising a frame, a vacuum bar upon which to place the bag mouth, said vacuum bar being secured to said frame, duct means connected with said vacuum bar and having a valve mounted on said frame for placing said vacuum bar in and out of communication with a vacuum source, a valve-operating element movably mounted on said frame and connected with said valve, a pressure bar above said vacuum bar and operative when lowered to hold the bag mouth in communication with said vacuum bar, bar-carrying means mounted for vertical movements on said frame and connected to said pressure bar, a sealing bar abreast of said vacuum bar and operative when raised to heat-seal the bag, additional bar-carrying means mounted for vertical movements on said frame and connected to said sealing bar, actuating means on said frame and operatively connected with both of said bar-carrying means and with said valve-operating element for causing timed operation thereof to effect vacuumizing and sealing of the bag, said valve-operating element being of the spring loaded toggle type and is retained in a last placed position, and said actuating means including a pair of cams, a first follower connected to said valve-operating element and engaged with one of said cams to move said valve to an open position, and a second follower connected to said valve-operating element and engaged with the other of said cams to move said valve to a closed position.

7. A structure as defined in claim 6 wherein said valve-operating element and said followers are rigidly mounted on a rockable shaft.

8. A vacuumizing and sealing machine for plastic bags, comprising a frame, a vacuum bar upon which to place the bag mouth, said vacuum bar being secured to said frame, duct means connected with said vacuum bar and having a valve mounted on said frame for placing said vacuum bar in and out of communication with a vacuum source, a valve-operating element movably mounted on said frame and connected with said valve, a pressure bar above said vacuum bar and operative when lowered to hold the bag mouth in communication with said vacuum bar, bar-carrying means mounted for vertical movements on said frame and connected to said pressure bar, a sealing bar abreast of said vacuum bar and operative when raised to heat-seal the bag, additional bar-carrying means mounted for vertical movements on said frame and connected to said sealing bar, and actuating means on said frame and operatively connected with both of said bar-carrying means and with said valve-operating element for causing timed operation thereof to effect vacuumizing and sealing of the bag, said actuating means including a shaft and cams, a motor for rotating said shaft, a switch for controlling the operation of said electric motor, and means on said pressure bar bar-carrying means for operating said switch and stopping said motor after each cycle of operation.

References Cited in the file of this patent

UNITED STATES PATENTS

| | | |
|---|---|---|
| 2,281,187 | Waters | Apr. 28, 1942 |
| 2,692,074 | Mueller et al. | Oct. 19, 1954 |
| 2,749,686 | Lorenz et al. | June 12, 1956 |
| 2,753,671 | Depuy et al. | July 10, 1956 |
| 2,858,655 | Mahaffy et al. | Nov. 4, 1958 |